United States Patent [19]

Ishimaru

[11] Patent Number: 4,933,774
[45] Date of Patent: Jun. 12, 1990

[54] VIDEO SIGNAL REPRODUCING APPARATUS UTILIZING FIELD MEMORY AND DELAYED SYNC

[75] Inventor: Masayoshi Ishimaru, Tokyo, Japan
[73] Assignee: Sony Corp., Tokyo, Japan
[21] Appl. No.: 235,283
[22] Filed: Aug. 23, 1988
[30] Foreign Application Priority Data
Aug. 26, 1987 [JP] Japan .................................. 62-211623
[51] Int. Cl.⁵ ............................................. H04N 5/76
[52] U.S. Cl. ................................. 358/335; 358/336; 358/337; 358/338; 360/10.1
[58] Field of Search ............... 358/148, 336, 337, 338, 358/340, 339; 360/10.1, 10.2, 36.1, 36.2

[56] References Cited
U.S. PATENT DOCUMENTS
4,731,659  3/1988  Kani ..................................... 358/312
4,788,604  11/1988  Takeuchi ............................. 360/10.3

*Primary Examiner*—Robert L. Richardson
*Attorney, Agent, or Firm*—Alvin Sinderbrand

[57] ABSTRACT

A video signal reproducing apparatus includes a field memory for storing one field of a reproduced video signal, a signal separator for extracting a horizontal sync pulse signal and a vertical sync pulse signal from the reproduced video signal, and an address counter responsive to the horizontal sync pulse signal for addressing the field memory. The apparatus in addition includes a pseudo signal generator and a reset signal generator. The pseudo signal generator is for producing a pseudo vertical sync pulse signal delayed relative to the vertical sync pulse signal. The reset signal generator is connected to the vertical sync pulse separator and the pseudo signal generator for producing a reset signal to reset the address counter. The reset signal generator normally uses the vertical sync pulse signal to produce the reset signal, but uses the pseudo vertical sync pulse signal to produce the reset signal when a vertical sync pulse is not obtained from the vertical sync pulse separator.

7 Claims, 3 Drawing Sheets

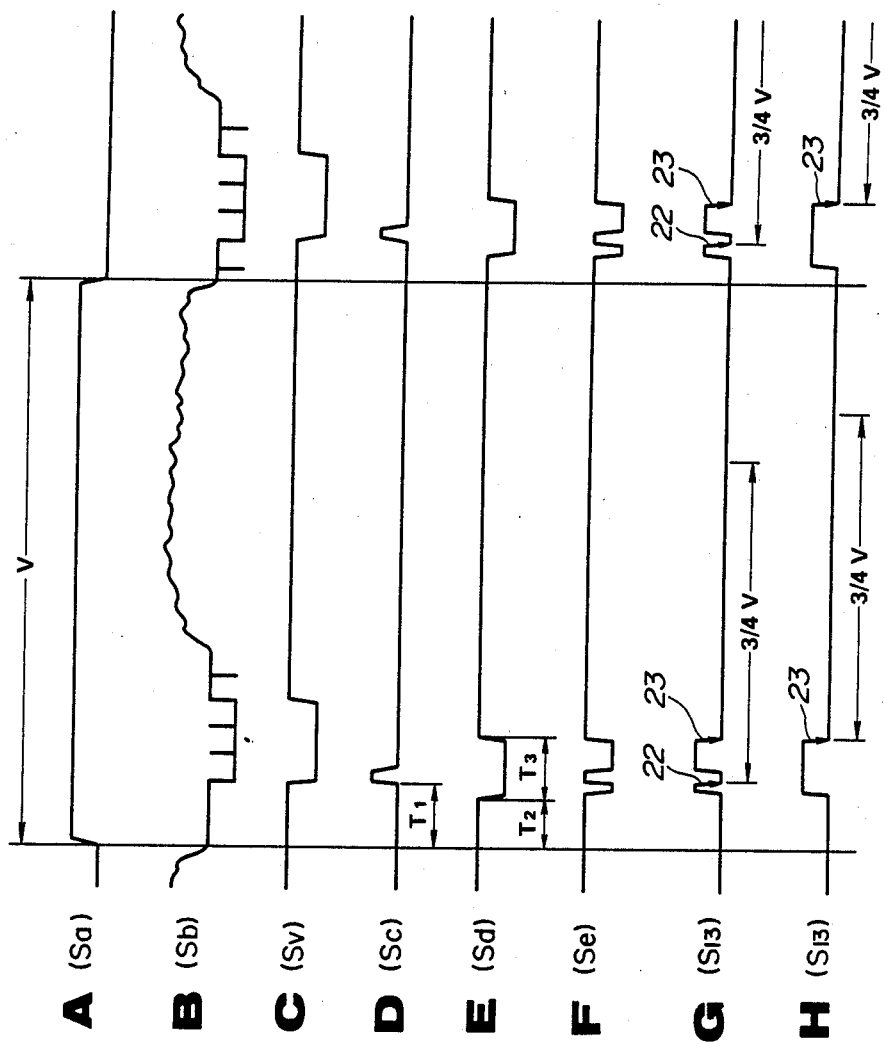

VIDEO SIGNAL REPRODUCING APPARATUS UTILIZING FIELD MEMORY AND DELAYED SYNC

BACKGROUND OF THE INVENTION

This invention relates to a video signal reproducing apparatus having a field memory for storing one field of a reproduced video signal and, more particularly, to an apparatus for controlling the operation of such field memory.

Video signal reproducing apparatus may include a field memory to obtain stroboscopic still playback, mosaic or solarization and other special effects achievable by storing a field of a reproduced video signal. Currently a field is stored in a write operation of a field memory in which horizontal and vertical synchronization (hereafter referred to as "sync") pulse signals extracted from the reproduced video signal time-synchronize the write operation with the reproduced video signal. However, because with VTR techniques the vertical sync pulse signal is reproduced just after head switching between two playback heads, the vertical sync pulse signal sometimes cannot be obtained. In particular, when the reproduced video signal has a poor S/N ratio or there is a great tracking error the vertical synch pulse signal may not be obtained. As a result, when the tracking error increases to such an extent that a vertical sync pulse signal cannot be obtained, an operator trying to adjust the tracking error cannot see know the extent of the tracking error from a view of the displayed image.

For this reason, an attempt has been made to replace the vertical sync pulse signal with a pseudo vertical sync pulse signal to control the field memory. The pseudo vertical sync pulse signal is obtained from an RF switching pulse signal which is in synchronism with the rotation of the read head drum. The RF switching pulse signal is produced by a pulse generator provided on the read head drum. However, jitter is introduced on the pseudo vertical sync pulse signal due to lack of uniformity of the playback head drum rotation. This causes a phase shift of the pseudo vertical sync pulse signal relative to the horizontal sync pulse signal resulting in the degradation of the displayed image.

SUMMARY OF THE INVENTION

A main object of the invention is to provide an improved video signal reproducing apparatus which can operate the field memory even when a vertical sync pulse is not obtained from the reproduced video signal.

In accordance with an aspect of this invention, a video signal reproducing apparatus including a field memory for storing one field of a reproduced video signal, a horizontal sync pulse separator for extracting a horizontal sync pulse signal from the reproduced video signal, a vertical sync pulse separator for extracting a vertical sync pulse signal from the reproduced video signal, and an address counter responsive to the horizontal sync pulse signal for addressing the field memory; is further provided with a pseudo signal generator for producing a pseudo vertical sync pulse signal delayed relative to the vertical sync pulse signal, and with a reset signal generator which is connected to the vertical sync pulse separator and the pseudo signal generator for producing a reset signal to reset the address counter. The reset signal generator normally responds to the vertical sync pulse signal to produce the reset signal, but responds to the pseudo vertical sync pulse signal to produce the reset signal when a vertical sync pulse is not obtained from the vertical sync pulse separator.

BREIF DESCRIPTON OF THE DRAWINGS

The invention together with its objects and advantages may be better understood by reference to the following description taken in conjunction with the accompanying drawings, in which like reference numerals identify like elements in the several figures and in which.

FIGS. 5(a) through 5(h) depict varoius waveforms which serve to illustrate the operation of the invention.

DETAILED DESCRIPTION OF THE INVENTION

Figure 1:
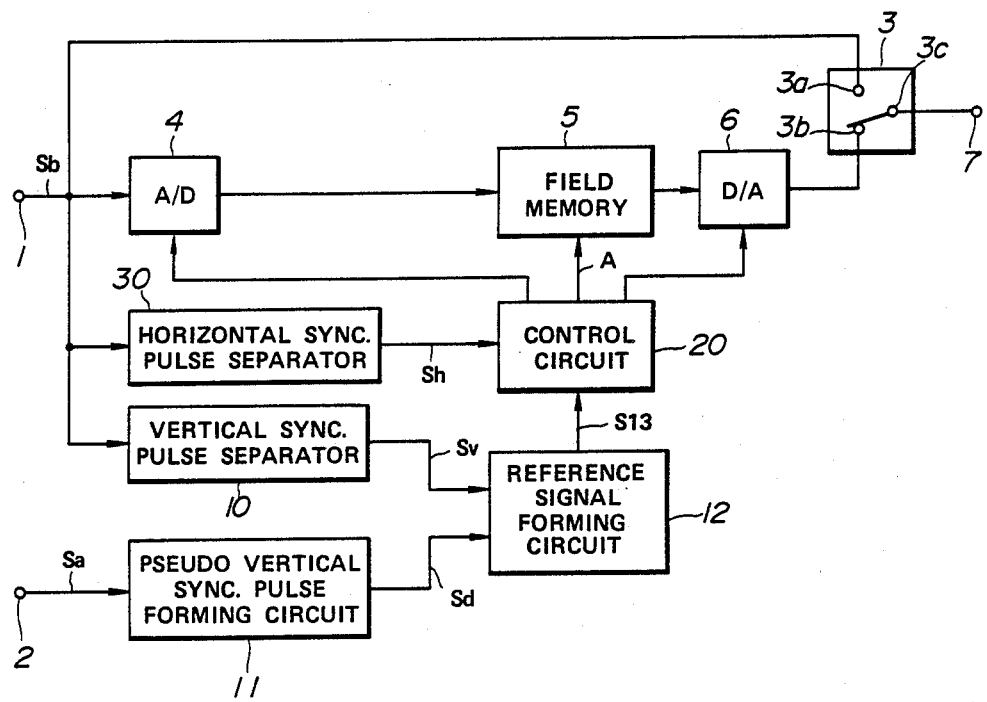
FIG. 1 is a schematic block diagram showing one embodiment of a video signal reproducing apparatus made in accordance with the invention.

Referring to the drawings and more particularly of FIG. 1, there is illustrated a video signal reproducing apparatus embodying the invention. The apparatus includes a first input terminal 1 for receiving a reproduced video signal $S_b$, a second input terminal 2 for receiving an RF switching pulse signal $S_a$, and an output terminal 7. The first input terminal 1 is connected to a playback mode switch 3, an A/D converter 4, a Horizontal sync pulse separator 30 and a vertical synch pulse separator 10. The playback mode switch includes two input terminals 3a and 3b, and an output terminal 3c. The reproduced video signal $S_b$ is input to the playback mode switch 3 at an input terminal 3a. In a first postion, the playback mode switch 3 connects the input terminal 3a to the output terminal 3c. This occurs in the normal playback mode. In a second position, the playback mode switch 3 connects the input terminal 3b to the output terminal 3c. This occurs in a special playback mode using the video signal read from the fiels memory 5. Thus, when in normal playback mode, the reproduced video signal $S_b$ enters the apparatus at terminal 1, passes through playback mode switch 3, which is in the first position, and is output through terminal 3c to an output terminal 7. In the special playback mode the reproduced video signal is received at the A/D converter 4, the horizontal synch pulse separator 30, and the vertical synch pulse separator 10. The A/D converter 4 converts the reproduced video signal $S_b$ into digital form for input and storage in the field memory 5. The field memory 5 has a capacity for storing one video signal field. The stored video signal is read from the field memory 5. A D/A converter 6 convertsa video signal read out of field memory 5 into analog form. The operations of the A/D converter 4, the field memory 5 and the D/A conveter 6 are time-synchronized in such a manner as described later.

The horizontal sync pulse separator circuit 30 receives the reproduced video signal $S_b$ also and extracts horizontal sync pulses from the reproduced video signal Sb to produce a horizontal sync pulse signal Sh at its output. The output of the horizontal sync pulse separator circuit 30 is connected to one input of a control circuit 20.

The reproduced video signal $S_b$, in addition is input to the vertical sync pulse separator circuit 10 which extracts vertical sync pulses from the reproduced video signal Sb to produce a vertical sync pulse signal Sv at its output. The output of the vertical sync pulse separator circuit 10 is connected to one input of a reference signal forming circuit 12 which outputs a signal to a second terminal of the control circuit 20. The reference signal forming circuit 12 has a second input terminal at which a signal Sd is received. Signal Sd is generated by a pseudo vertical sync pulse forming curcuit 11. The pseudo vertical sync pulse forming circuit 11 receives of RF pulse signal Sa and converts the RF pulse signal Sa to a pseudo vertical sync pulse signal Sd. For example, the pseudo vertical sync pulse forming circuit 11 may include multivibrators for providing a pulse at the leading or trailing edge of each RF switching pulse. Normally, the pseudo vertical sync pulse signal Sd is delayed a predetermined time relative to the vertical sync pulse signal Sv.

Figure 2:
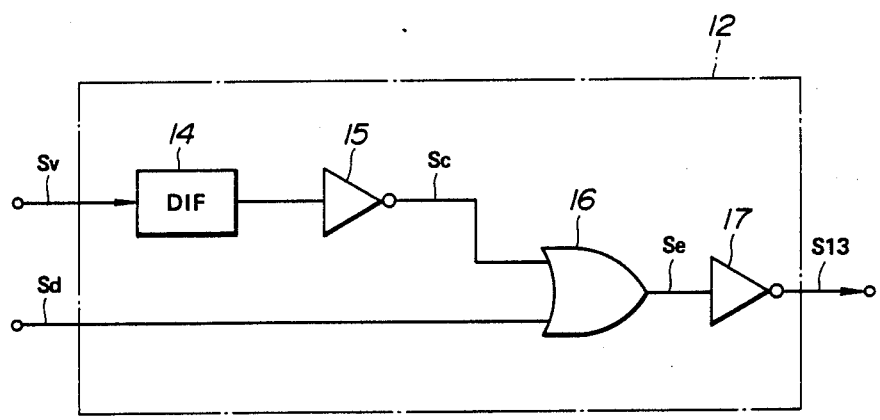
FIG. 2 is a schematic block diagram showing the reference signal forming circuit of FIG. 1.

Referring to FIG. 2, the reference signal forming circuit 12 includes a differentiating circuit 14 which receives the vertical sync pulse signal Sv. The differentiating circuit 14 differentiates the vertical sync pulse signal Sv to produce a differentiated pulse signal having its pulse width narrowed to a sufficient extent. The differentiated vertical sync pulse signal is applied to an inverter 15 where it is inverted. Thke inverted signal, Sc, is applied to one input of an or circuit 16. The other input of OR circuit 16 is the pseudo vertical sync puolse Sd received from the pseudo vertical sync pulse forming circuit 11. The OR circuit 16 produces a composite signal Se at its output. Normally, the composite signal Se has two pulses during one vertical time period V. The first pulse, which precedes to the second pulse, is obtained from the vertical sync pulse signal Sv. The second pulse is obtained from the pseudo vertical sync pulse signal Sd fed from the pseudo vertical sync pulse forming circuit 11. When no vertical sync pulse is produced from the vertical sync pulse separator circuit 10, the composite signal Se has only one pulse obtained from the pseudo vertical sync pulse signal Sd. The output of the OR circuit 16 is connected through an inverted 17 to the control circuit 20. The inverter 17 inverts the composite signal Se to produce a reference pulse signal S13 output to the control circuit 20.

Figure 3:
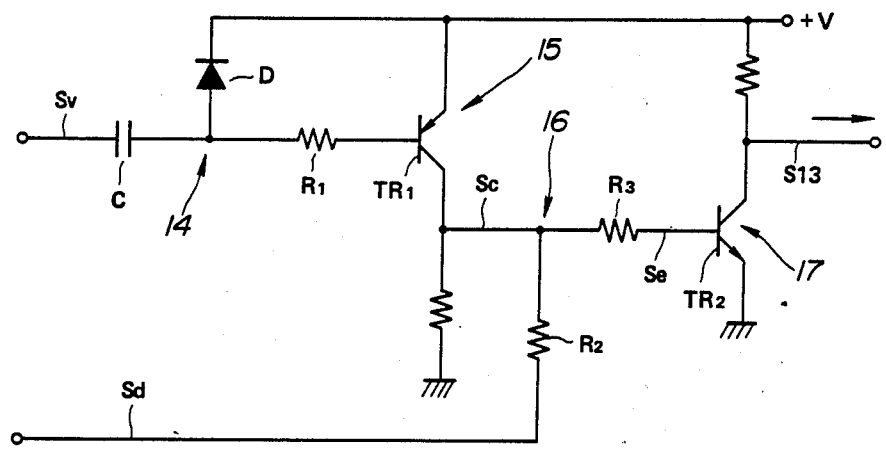
FIG. 3 is a circuit diagram showing the detailed arrangement of the reference signal forming circuit of FIG. 1.

Referring to FIG. 3, there is shown the detailed arrangement of the reference signal forming circuit 12 which includes a capacitor C at one input to receive the vertical sync pulse signal Sv. The capacitor C is connected in series through a resistor R1 to the base of a PNP transistor TR1 and through a diode D to the emitter of the transistor TR1. The emitter of the transistor TR1 is also connected to a +V power supply. The collector of the transistor TR1 is connected through a resistor to ground and also to a junction 16 to which the pseudo vertical sync pulse forming circuit 11, is connected through a resistor R2, also is connected. The junction 16 is connected through a resistor R3 to the base of an NPN transistor TR2 having an collector connected to ground. The emitter of the transistor TR2 is connected through a resistor to the +V supply and also to the control circuit 20. The combination of the capacitor C and the resistor R1 constitutes the differentiating circuit 14 (FIG. 2) which differentiates the vertical sync pulse signal Sv. The transistor TR1, which amplifies and inverts the differentiated signal applied to its base, constitutes the inverter 15 (FIG. 2). The inverted signal Sc is applied to the junction 16 to which the pseudo vertical sync pulse signal Sd is applied. The junction constitutes the OR circuit 16 (FIG. 2). The junction is connected to the base of the transistor TR2 which constitutes the inverter 17 (FIG. 2). The transistor TR2 produces an output S13 at its collector for output to the control circuit 20.

Figure 4:
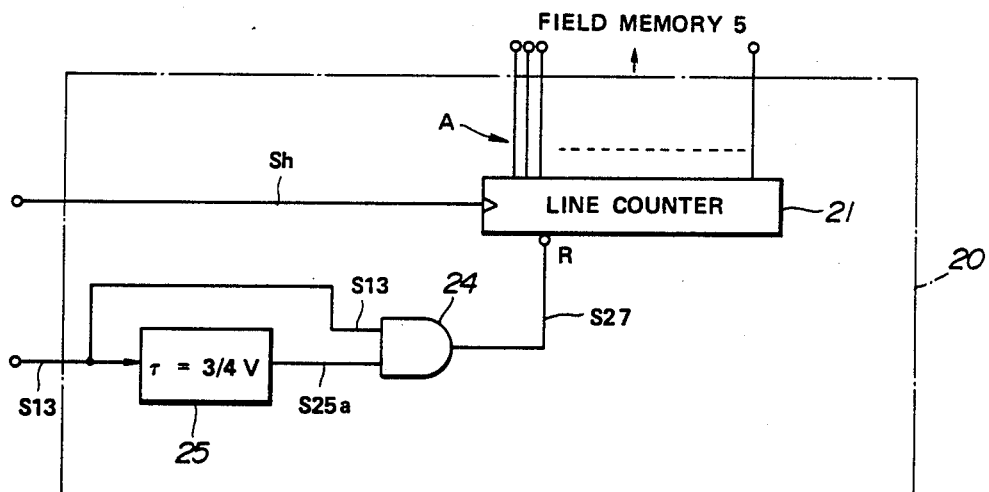
FIG. 4 is a schematic block diagram showing the control circuit of FIG. 1.

Referring to FIG. 4, the control circuit 20 includes an AND circuit 24 having an input coupled directly to the refernce signal forming circuit 12 so as to receive the signal S13. Signal S13 also is input to an astable multivibrator 25 which outputs a signal S25a to the other input of the AND circuit 24. The astable multivibrator 25 produces a mask pulse S25a at the trailing edge of the preceding pulse of the reference pulse signal S13. The mask pulse S25a has a predetermined pulse width $\tau$ to mask the following pulse of the pseudo vertical sync pulse signal Sd. When no vertical sync pulse is produced from the vertical sync pulse separator circuit 10, the astable miltivibrator 25 produces a mask pulse S25a at the trailing edge of each of the pulses of the reference pulse signal S13. The AND circuit 24 has an output S27 coupled to the reset terminal R of a line counter 21. The AND circuit 24 produces a reset pulse signal S27 to reset the line counter 21 normally at the trailing edge of the preceding pulse of the reference pulse signal S13. The AND circuit 24 produces a reset pulse signal S27 at the trailing edge of each of the pulses of the reference pulse signal S13 when no vertical sync pulse is produced from the vertical sync pulse separator circuit 10. The line counter 21, in addition, receives the horizonal sync pulse signal $S_H$. The line counter 21 counts the horizontal sync pulses fed thereto from the horizontal sync pulse separator circuit 30 to produce address signals A. The address signals A are applied to address the field memory 5 to store one line of video signal.

The operation of the video signal reproducing apparatus will be described subsequently with reference to FIG. 5.

FIG. 5A shows the waveform of the RF switching pulse signal Sa in which switching pulses each have a pulse width corresponding to one vertical time period V. The RF switching pulse signal Sa is applied to the pseudo vertical sync pulse forming circuit 11. The RF switching pulse signal Sa may be generated by a pseudo signal generator which also includes the pseudo vertical sync pulse formign circuit 11 (of which only the pseudo vertical sync pulse forming circuit 11 is shown).

FIG. 5B shows the waveform of the reproduced video signal Sb input to the A/D converter 4, the horizontal sync pulse separator circuit 30 and the vertical sync pulse separator circuit 10. The A/D converter 4 converts the reproduced video signal Sb into a digital video signal. The digital video signal is fed to the field memory 5 where it is stored. The stored video signal is read from the field memory 5 to the D/A converter 6. The horizontal sync pulse separator circuit 30 extracts, from the reproducred video signal Sb, horizontal sync pulses which form the horizontal sync pulse signal Sh applied to the line counter 21. The line counter 21 is incremented for each of the horizontal sync pulses to vary the address accessed in the field memory 5. The vertical sync pulse separator circuit 10 extracts, from the reproduced video signal Sb, vertical sync pulse to form the vertical sync pulse signal Sv applied to the reference signal forming circuit 12. As shown in FIG.

5C, the vertical sync pulse signal Sv includes one vertical sync pulse during the one vertical time period D. The vertical sync pulse has a trailing edge delayed a predetermined time period T1 relative to the time at which the head switchiing is made between the playback heads. The time period T1 is approximately equal to $7 \pm 2H$ (H is a time period of one horizontal line, i.e., 63.5 microseconds).

The pseudo vertical sync pulse forming circuit 11 converts the RF switching pulse signal Sa into a pseudo vertical sync pulse signal Sd. As shown in FIG. 5E, the pseudo vertical sync pulse signal Sd includes one pseudo vertical sync pulse during one vertical time period V. The pseudo vertical sync pulse has a predetermined pulse width T3 and a trailing edge delayed at a predetermined time period T2 relative to the leading edge of the Rf switching pulse. The pulse width T3 corresponds to 4H and the time period TR corresponds to 5H.

In the reference signal forming circuit 12, the differentiating circuit 14 differentiates the vertical sync pulse signal Sv (FIG. 5C) to narrow its pulse width to a great extent. The differentiated signal is inverted by the inverter 15. The inverted signal Sc has a narrow pulse width, as shown in FIG. 5D. The inverted signal Sc is appled, along with the pseudo vertical sync pulse signal Sd, to the OR circuit 16. The OR circuit 16 composes these input signals into a composite signal Se which normally includes two pulses, as shown in FIG. 5F. The composite signal Se is applied to the inverter 17 which invertes the composite signal Se to produce a reference pulse signal S13. Normally, the reference pulse signal Se includes two trailing edges 22 and 23 during the one vertical time period V, as shown in FIG. 5G. The preceding trailing edge 22 is obtained from the vertical sync pulse signal Sv and the following trailing edge 23 is obtained from the pseudo vertical sync pulse signal Sd. It is to be noted that the vertical sync pulse signal Sv is differentiated to have a pulse width narrowed to such an extent that the trailing edge 22 always occurs in advance of the trailing edge 23 even when the vertical sync pulse separator circuit 10 produces a vertical sync pulse signal Sv having a pulse width longer than a predetermined value. When no vertical sync pulse is produced from the vertical sync pulse separator circuit 10, the reference pulse signal S13 includes only one pulse obtained from the pseudo vertical sync pulse signal Sd, as shown in FIG. 5H.

In the control circuit 20, the reference pulse signal S13 is applied directed to the AND circuit 24 and also through the astable multivibrator 25 to the AND circuit 24. The astable multivibrator 25 responds to a trailing edge of the reference pulse signal S13 by producing a mask signal S25a having a predetermined pulse width $\tau$ corresponding to $V \times \frac{3}{4}$ where V is one vertical time period. Normally, the astable multivibrtator 25 produces the mask signal S25a at the preceding trailing edge 22, as shown in FIG. 5G. The mask signal S25a is applied to cause the AND circuit 24 to pass the preceding trailing edge 22 obtained from the vertical sync pulse signal Sv and mask the following trailing edge 23 obtained from the pseudo vertical sync pulse signal Sd. This causes the line counter 21 to be reset once during the one vertical time period V at the trailing edge 22 of the reset pulse signal S27. In this case, the following trailing edge 23 has no effect on the astable multivibrator 25. When no vertical sync pulse is obtained from the vertical sync pulse separator circuit 10, the astable multivibrator 25 produces the mask signal at the trailing edge 23 obtained from the pseudo vertical sync pulse, as shown in FIG. 5H. In this case, the line counter 21 is cleared includes an address counter responsive to a horizontal sync pulse signal extracted from a reproduced video signal for addressing a field memory having a capacity of storing one field of the reproduced video signal. The apparatus comprises a pseudo signal generator for producing a pseudo vertical sync pulse signal delayed relative to vertical sync pulse signal extracted from the reproduced video signal. The pseudo vertical sync pulse signal is obtained always from an RF switchiing pulse signal or a reference sync pulse signal applied to a rotary head servo control circuit. A reset signal generator selectively uses either the vertical sync pulse signal or the pseudo vertical sync pluse signal to produce a reset signal applied to reset the address counter. Normally, the reset signal gernerator uses the vertical sync pulse signal to produce the reset signal so that no jitter is introduced on the reproduced video signal. When no vertical sync pulse is obtained from the reproduced video signal due to tracking errors, the reset signal generator uses the pseudo vertical sync pulse signal. Although, in this case, jitter is introduced on the reproduced video signal to degrade the displayed image quality, there is no problem in adjusting the tracking error while watching the display image. It is, therefore, apparent from the foregoing that the invention provides an improved video signal reproducing apparatus which can rewrite the field memory even when no vertical sync pulse is obtained from the reproduced video signal.

Although the invention has been described in connection with a VTR, it is to be understood that it is also applicable to a video disc player or the like where a vertical sync pulse sometimes is not obtained.

While this invention has been described in conjunction with a specific embodiment thereof, it is evident that many alternatives, modifications and variations will apparent to those skilled in the art. Accordingly, it is intended to embrace all alternatives, modifications and variations that fall within the scope of the appended claims.

What is claimed is :

1. In a video signal reproducing apparatus including a field memory for storing one field of a reproduced video signal, a horizontal sync pulse separator for extracting a horizontal sync pulse signal from the reproduced video signal, a vertical sync pulse separator for extracting a vertical sync pulse signal from the reproduced video signal, and, an address counter responsive to the horizontal sync pulse signal for addressing the field memory; the combination of a pseudo signal generator for producing a pseudo vertical sync pulse signal delayed relative to the vertical sync pulse signal; and reset signal generator means connected to said vertical sync pulse separator and said pseudo signal generator for normally producing a reset signal to reset the address counter, in response to said vertical sync pulse signal and for producing said reset signal in response to said pseudo vertical sync pulse signal only when no vertical sync pulse is obtained from the vertical sync pulse separator.

2. The video signal reproducing apparatus as claimed in claim 1, wherein the pseudo signal generator means includes means for producing an RF switching pulse signal, and means for producing the pseudo vertical sync pulse signal delayed a predetermined time relative to the RF switching pulse signal, the pseudo vertical sync pulse signal having a predetermined pulse width.

3. The video signal reproducing apparatus as claimed in claim 1, wherein said reset signal generator means includes an OR circuit for receiving an input from the vertical sync pulse separator and for receiving another input from the pseudo siganl generator to produce a reference pulse siganl at its output, the reference pulse signal having first and second pulses during one vertical time period when inputs are received from the vertical sync pulse separator and from the pseudo signal generator, the first pulse corresponding to the vertical sync pulse signal, the second pulse corresponding to the pseudo vertical sync pulse of the pseudo vertical sync pulse signal.

4. The video signal reproducing appartus as claimed in claim 3, wherein the reset signal generator means includes means for causing the first pulse to precede the second pulse.

5. The video siganl reproducing apparatus as claimed in claim 4, wherein the reset signal generator includes a differentiating circuit receiving an input from the vertical sync pulse signal separator and generating an output to the OR circuit for differentiating the vertical sync pulse signal.

6. The video signal reproducing apparatus as claimed in claim 5, wherein the reset signal generator means includes means for masking the second pulse.

7. The video signal reproducing apparatus as claimed in claim 5, wherein the resest signal generator means includes an AND circuit receiving as one input the output of the OR circuit, receiving as another input the output of the OR circuit through an astable multivibrator and producing at its output the reset signal.

* * * * *